United States Patent [19]

Paunov et al.

[11] Patent Number: 4,635,460
[45] Date of Patent: Jan. 13, 1987

[54] APPARATUS FOR AND METHOD OF THE PLASTIC FORMING OF MATERIALS

[75] Inventors: Boyan I. Paunov; Teodor A. Balevski; Bojidar S. Ivanov, all of Sofia, Bulgaria

[73] Assignee: Institute Po Metaloznanie I Technologia Na Metalite, Sofia, Bulgaria

[21] Appl. No.: 728,266

[22] Filed: Apr. 29, 1985

Related U.S. Application Data

[63] Continuation-in-part of Ser. No. 395,281, Jul. 6, 1982, abandoned, which is a continuation-in-part of Ser. No. 149,536, May 14, 1980, abandoned.

[30] Foreign Application Priority Data

May 14, 1979 [BG] Bulgaria .................................. 43564

[51] Int. Cl.⁴ .................................................... B21C 26/00
[52] U.S. Cl. ........................................ 72/259; 72/273; 72/354; 72/465
[58] Field of Search ..................... 72/253.1, 273, 273.5, 72/259, 264, 265, 266, 267, 353, 354, 396, 397, 432, 453.13, 465, 374, 710, 271, 377

[56] References Cited

U.S. PATENT DOCUMENTS

| | | | |
|---|---|---|---|
| 1,967,245 | 7/1934 | Hothersall | 72/432 |
| 2,382,045 | 8/1945 | Flowers | 72/377 |
| 2,778,493 | 1/1957 | Kreidler | 72/265 |
| 2,964,177 | 12/1960 | Scribner | 72/259 |
| 2,965,228 | 12/1960 | Scribner | 72/273.5 |
| 3,292,413 | 12/1966 | Falcioni | 72/429 |
| 3,443,412 | 5/1969 | Webb | 72/432 |
| 3,521,472 | 7/1970 | Bringewald | 72/353 |
| 3,847,004 | 11/1974 | Bringewald | 72/353 |

FOREIGN PATENT DOCUMENTS

| | | | |
|---|---|---|---|
| 1278936 | 11/1961 | France | 72/432 |
| 184595 | 7/1966 | U.S.S.R. | 72/267 |

Primary Examiner—Lowell A. Larson

[57] ABSTRACT

Method of plastically deforming a body of malleable solid material between male and female dies which are forcible pressed together. The material is subjected to repeated identical pressing cycles; in each pressing cycle the force between the dies is concentrated consecutively on separate sections of the surface of the material being deformed. The body may be directly or indirectly extruded into an elongated shape from a location between the male and female dies which is disposed nearest the section of the surface of the material being deformed in each pressing cycle, or it may be deformed between the dies without any appreciable portion thereof escaping from between the dies.

9 Claims, 9 Drawing Figures

APPARATUS FOR AND METHOD OF THE PLASTIC FORMING OF MATERIALS

This application is a continuation-in-part of application Ser. No. 395,281, filed July 6, 1982, which in turn is a continuation-in-part of application Ser. No. 149,536, filed May 14, 1980, both now abandoned.

This invention relates to an apparatus for the plastic forming of materials in cold and hot state, particularly for the plastic forming of such materials by direct extrusion, backflow extrusion, and stamping, and to the method performed thereby.

An apparatus for the plastic forming of materials is known comprising a container with the processed material, said material being in contact on one of its sides with a male die, and on its other side with a female die which is made up of several elements. Such elements are movably arrange one with respect to the other. These elements, with the exception of the one closest to the product, are supported on elastic supports. The element which is closest to the product is supported on a rigid support.

The drawbacks of this known apparatus lie in the necessity of having several elastic supports for the respective movable elements, the provision of high working pressures in these elastic supports, in the difficult setting which require a respective pre-stressing of each separate elastic support, and in the low degree of versatility of the apparatus when the geometry of the base blank and the finished product are changed.

It is therefore a general object of this invention to provide an apparatus for the plastic forming of materials, such apparatus operating with a common elastic medium which is subjected to considerably lower working stresses than those which occur in the above-described prior art apparatus. Moreover, the apparatus of the invention provides conditions for the easy and quick setting of the elements thereof, and possesses a high degree of versatility.

The above-outlined objects are achieved by the apparatus of the invention for the plastic forming of materials. Such apparatus comprises a container for the material to be processed, a first male die or ram, and a second male die which is built up of elements arranged movably one with respect to the other which are in contact with one of their ends with the processed material, the other of their ends being in contact with the respective intermediate forming elements of the apparatus. One of the intermediate forming elements is supported on a disc which is rigidly attached to the one side of a housing body, while the remaining intermediate forming elements are supported on respective cylindrical supports which pass movably through holes in the disc and are in contact with supporting elements which are telescoped one within the other with loose fits and seals.

The outermost supporting element is positioned movably and with a seal in a hole in the housing body, there being a cover which hermetically closes the hole in the housing body. The space in the housing body between the cover and the supporting elements is filled up with a liquid and is connected via a pressure reducer to a reservoir filled with an elastic medium. The reservoir is provided with a non-return (check) valve and with units for measuring and limiting the pressure of the elastic medium in the reservoir. The elastic medium is pressurized to a preliminary pressure which is predetermined and is chosen depending on the resistance of the processed material to its deformation. The type and volume of the elastic medium is so chosen that at a pressure higher than the preliminarily chosen pressure, the elastic medium is compressible to a desired degree.

A force-producing machine produces a pre-set pulsating force on the first male die or ram and the cover; this produces a preset pulsating force upon the cover directed axially of such parts. Each pulsation of the force consists of one increase and one decrease of the force exerted between the first male die or ram and the cover within two limiting values, that is, a high value and a low value.

In the case of direct extrusion, the intermediate and supporting elements are concentrically inserted sleeves which can move relatively to each other in an axial direction, while the innermost intermediate sleeve is supported on the disc. The disc has a central through-hole with a diameter slightly greater than the diameter of the part to be produced. The cover also has a central through-hole, while the innermost one of the supporting sleeves is provided with two steps and is arranged with its smaller step movably positioned in the central through-hole in the cover and being sealed thereto.

In the case of backflow extrusion, and in the case of forming the material by stamping, the innermost intermediate element and the innermost supporting element are shaped as cylindrical mandrels, while the remaining intermediate and supporting elements are shaped as sleeves which are inserted one into the other and which can move relative to each other in an axial direction. In the case of backflow extrusion, the outermost intermediate sleeve is supported on the disc. In the case of stamping, the elements which are in contact with the worked material have a contact surface corresponding to the configuration of the product to be produced, while the intermediate element supported by the disc corresponds to the element of the composite die which forms the final configuration of the product.

The advantages of the apparatus according to the invention lie in the possibility of its being easily and quickly set, of its having a high degree of versatility, and the fact that there is required only one elastic element which works at a considerably lower stress or pressure than in the prior art apparatus described above.

For a better understanding of the invention, reference should be made to the accompanying drawings in which there are illustrated preferred embodiments of the invention. In the drawings.

Figures 1, 1A:
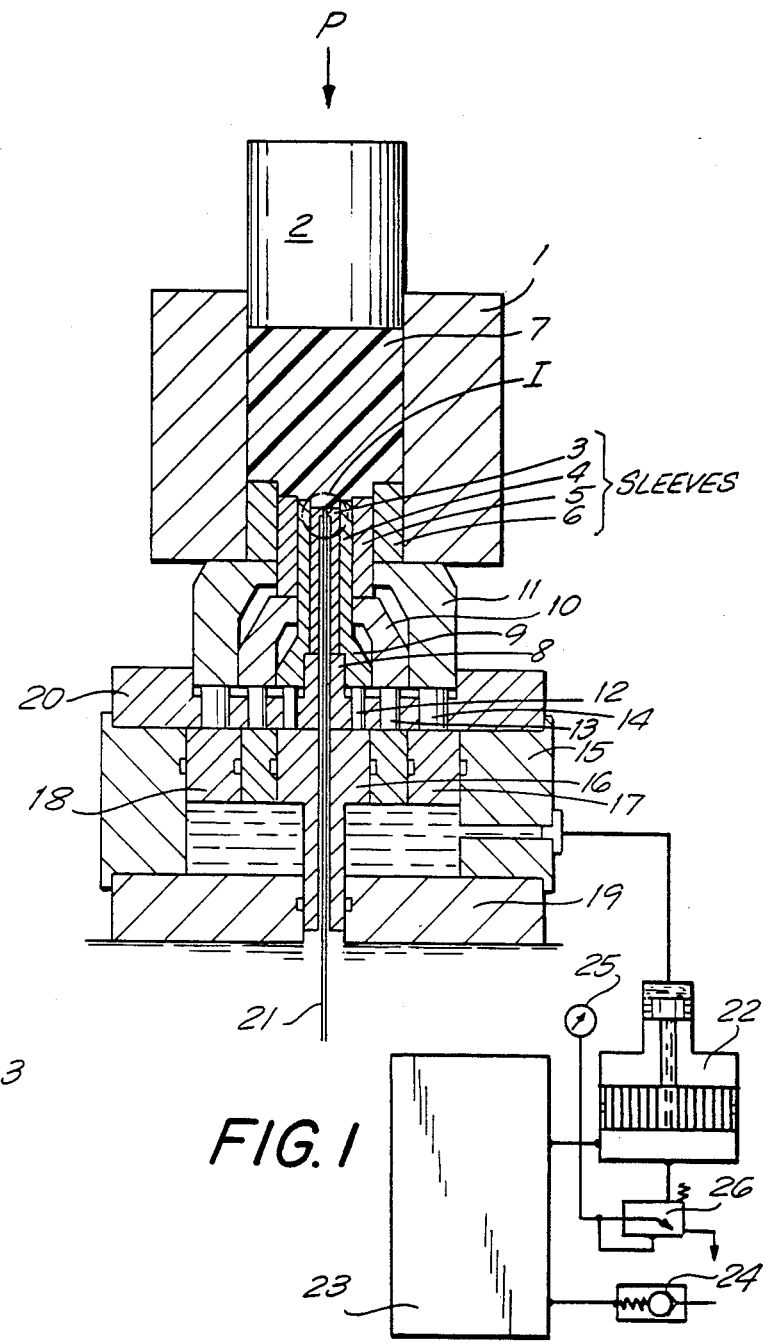
FIG. 1 is a schematic view in axial cross-section of an apparatus for direct extrusion, such figure showing in schematic form control elements for such apparatus.
FIG. 1a is a fragmentary view in section of the portion of the apparatus shown in FIG. 1 and designated I, FIG. 1a being on enlarged scale.
Figure 3:
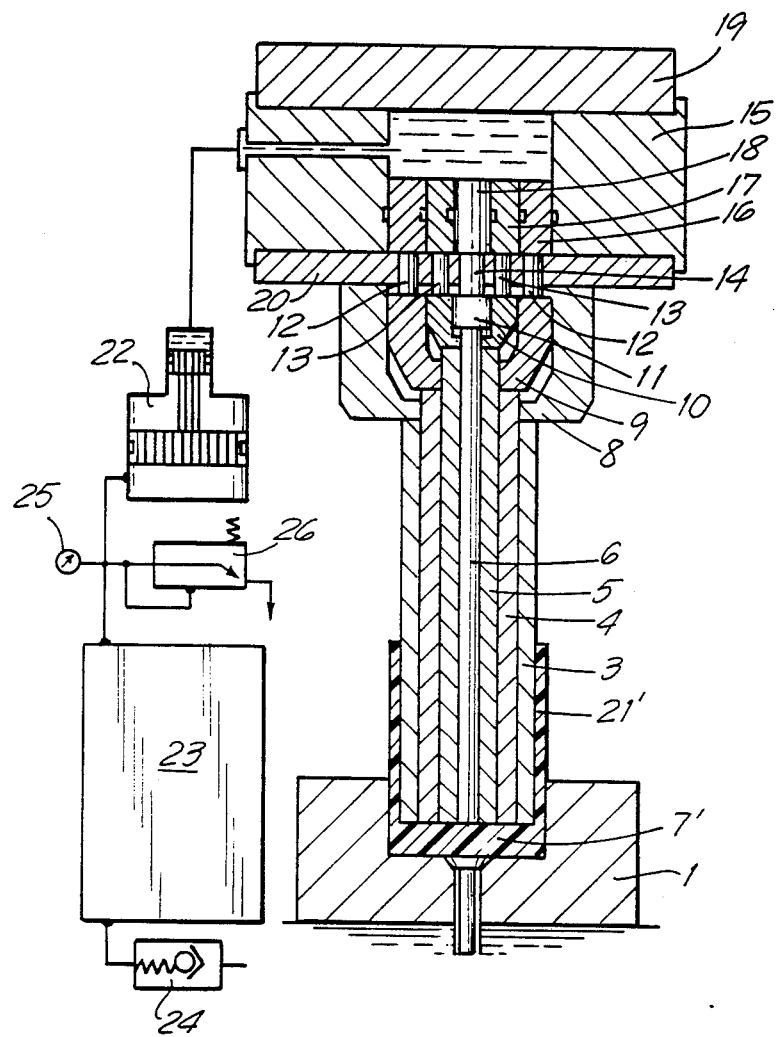

FIGS. 2a–2e, inclusive show the different successive steps of the extrusion of a product by the apparatus of FIG. 1 which are effected during one pulsation of the force exerted upon the material being extruded;

FIG. 3 shows an apparatus for the backflow extrusion of a cup-shaped part; and

Figure 4:
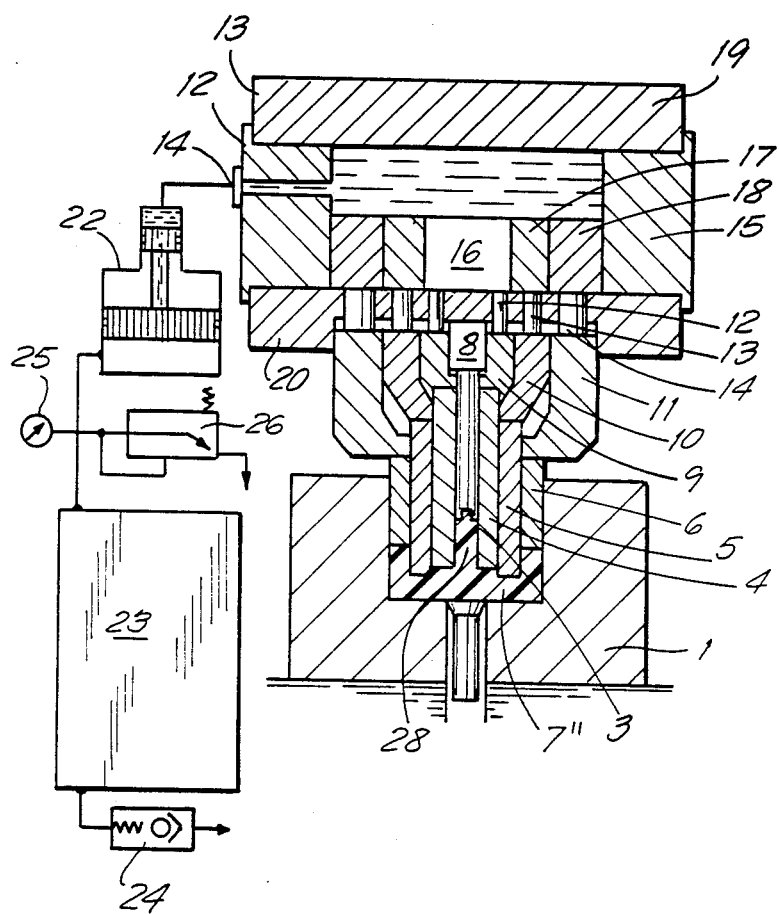

FIG. 4 shows an apparatus for the deformation of material by stamping.

Turning first to FIGS. 1 and 2a–2e, inclusive., the apparatus for direct extrusion comprises a container 1 with a through-hole, inside which there is disposed a first male die or ram 2, the worked material 7, and a second male die make up of four sleeves 3, 4, 5, and 6 which are concentrically inserted one into another with a loose fit. The innermost sleeve 3 is supported by an intermediate sleeve 8 the lower end of which engages a disc 20 having a central through-hole, such throughhole being coaxial with the diameter of the extruded product 21. Each of the remaining three sleeves 4, 5, and 6 is supported by respective intermediate sleeves 9, 10, and 11 which in turn are supported by respective cylindrical supports 12, 13, and 14, which pass freely through holes in the disc 20.

Disc 20 is fastened rigidly to one side of the housing body 15 concentrically therewith. The housing body 15 is provided with a central hole within which there are disposed three supporting sleeves 16, 17, and 18 which are concentrically inserted one into another with a loose fit and with seals therebetween, each of which is in contact with the respective cylindrical support 12, 13, and 14. The outermost supporting sleeve 18 is movably attached with a seal in the hole of the housing body 15, while the innermost supporting sleeve 16 has two housing steps and is disposed with its smaller step movably in a central through-hole in cover 19 to which it is sealed, the cover hermetically closing the hole in the housing body 15. The space of the housing body 15 between the cover 19 and the supporting sleeves 16, 17, and 18 is filled with machine oil and is connected via a pressure reducer 22 to a reservoir 23, which is filled with pressurized air or other suitable gas and is provided with a non-return (check) valve 24, a pressure gauge 25, and a valve 26 for limiting the maximum pressure of the pressurized air. The pressure of the pressurized air is previously increased, before the extrusion operation, to a value chosen depending upon the resistance of the worked material against its plastic deformation.

The direct extrusion apparatus of FIG. 1 operates as follows:

A force-producing machine (not shown) produces a pre-set pulsating force P on the first male die or ram 2 (FIGS. 1–2e, inclusive) and produces a pre-set pulsating force upon the cover 19 directed axially of such parts. Each pulsation of the force P consists of one increase and one decrease of the force exerted between the parts 2 and 19 within two limiting values, that is, a high value and a low value.

During the period of increase of the pulsating force P, there is a moment in which the pressure of the pressurized air or other gas in the reservoir 23 exceeds its pre-set value. At this time, the male die 2, the container 1 with the worked material 7, as well as the sleeves 4, 5, 6, the intermediate sleeves 9, 10, as well as the sleeves 4, 5, 6, the intermediate sleeves 9, 10, 11, the cylindrical supports 12, 13, 14 and the supporting sleeves 16, 17, 18 move downwardly with respect to the rigid elements, that is, with respect to the sleeve 3, the intermediate sleeve 8, the housing body 15, the cover 19 and the disc 20. At this time, through the hole in the rigid sleeve 3 there is extruded part of the product 21, while the pushed-out volume of machine oil additionally pressurizes the air or other gas inside the reservoir 23, and the parts are then moved from their initial position (2a) to the position thereof shown in FIG. 2b.

Figure 2A:
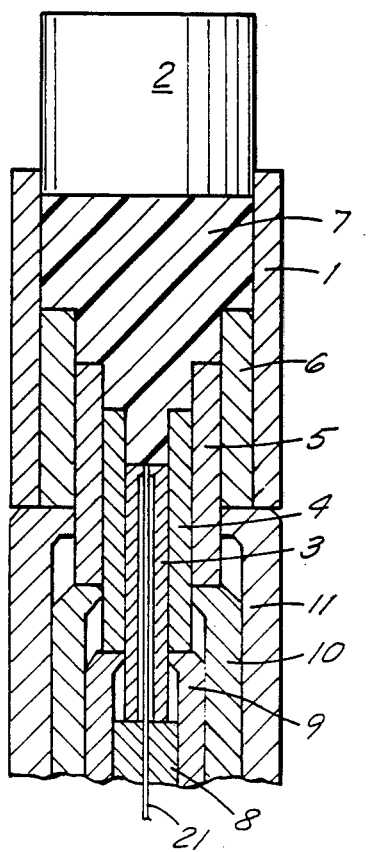
Figure 2B:
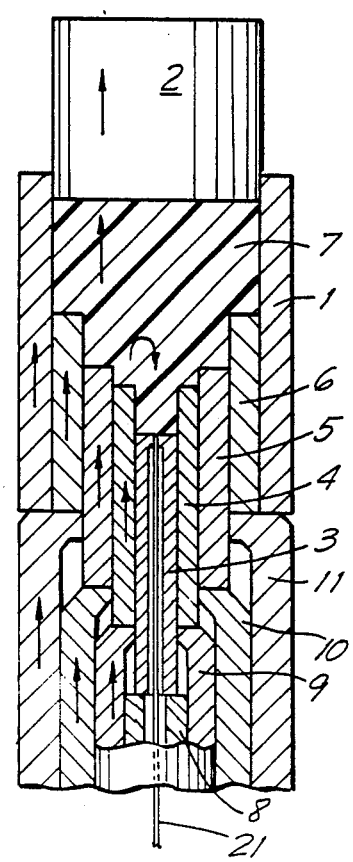
Figure 2C:
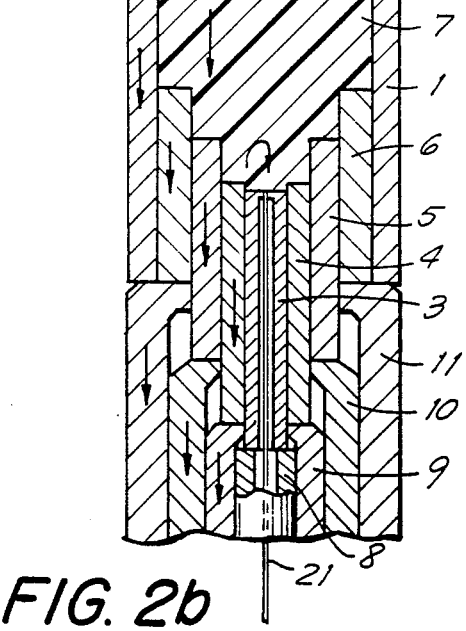

There next follows a predetermined reduction of the downwardly directed force P, at which time the container 1 with the worked material 7, the male die 2, the sleeves 5 and 6, the intermediate sleeves 10 and 11, the cylindrical supports 13 and 14, and the supporting sleeves 17 and 18 move upwardly with respect to the immovable elements as shown in FIG. 2c, that is, with respect to the sleeve 3, the intermediate sleeve 8, the housing body 15, the cover 19 and the disc 20. Simultaneously with this, the sleeve 4, the intermediate sleeve 9, the cylindrical support 12, and the supporting sleeve 16 move upwardly with respect to the container 1 with the worked material 7, the male die 2, the sleeves 5 and 6, the intermediate sleeves 10 and 11, the cylindrical supports 13 and 14, and the supporting sleeves 17 and 18, the sleeve 4 now effecting a plastic conveying of the material 7 in the space made free by the sleeve 3. This action is shown in FIG. 2c. This plastic conveying of the material under the action of the sleeve 4 continues until the moment when the sleeve 16 touches the disc 20.

Figure 2D:
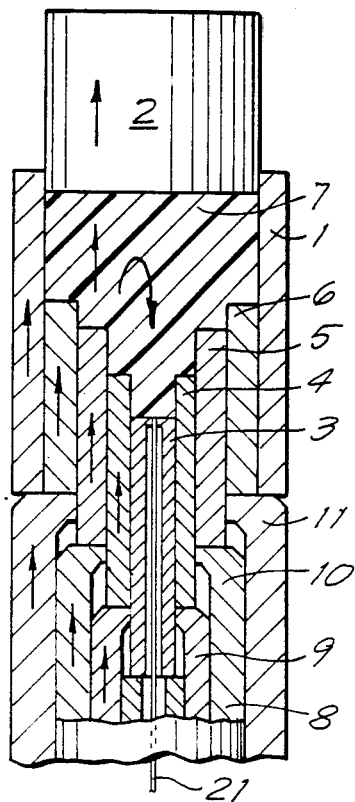

With a further decrease of the force P, the container 1 with the worked material 7, the male die 2, the sleeve 6, the intermediate sleeve 11, the cylindrical support 14 and the supporting sleeve 18 move upwardly with respect to the sleeves 3 and 4, the intermediate sleeves 8 and 9, the cylindrical support 12, the supporting sleeve 17 move upwardly with respect to the container 1 with the material 7, the male die or ram 2, the sleeve 6, the intermediate sleeve 11, the cylindrical support 14, and the supporting sleeve 18, so that the sleeve 5 effects a plastic conveying of material in the space made free by the sleeve 3 and 4. This action is depicted in FIG. 2d. The plastic conveying of the material under the action of sleeve 5 is continued up to the moment when the supporting sleeve 17 touches the disc 20.

Figure 2E:
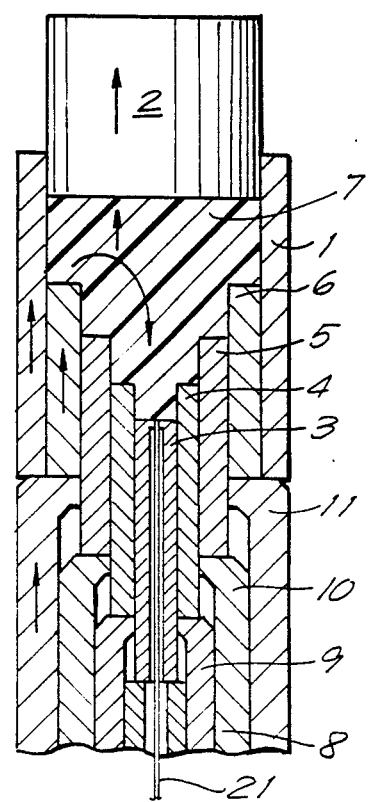

With the further decrease of the force P, the worked material 7 and the male die 2 move upwardly with respect to the sleeves 3, 4, and 5, the intermediate sleeves 8, 9, 10, the cylindrical supports 12 and 13, the supporting sleeves 16 and 17, the housing body 15, the cover 19 and the disc 20. Simultaneously with this, the container 1, the sleeve 6, the intermediate sleeve 11, the cylindrical support 14 and the supporting sleeve 18 move upwardly with respect to the worked material 7 and the male die 2, and at that time the sleeve 6 effects a plastic conveying of material in the space made free by the sleeves 3, 4, and 5. This action is shown in FIG. 2e. The plastic conveying of material under the action of the sleeve 6 continues up to the moment when the supporting sleeve 18 touches the disc 20.

This terminates one pulsation of the force P and the extrusion of one portion of the product 21. By a multiple repetition of such pulsation of the force P, there is extruded the volume of the whole blank while the apparatus repeatedly performs the aforedescribed operation.

FIG. 3 depicts apparatus for the backflow extrusion of a cup-shaped part. No further description of the apparatus of FIG. 3 is necessary since parts of the apparatus shown in FIG. 3, which are the same as or similar to those shown in FIG. 1, are designated by the same reference characters. In this case, the product is a cup-shaped body having a bottom 7' and a side wall 21'. Such cup-shaped body was formed from an initial disc-shaped blank.

The similarity between the backflow extrusion apparatus of FIG. 3 and the stamping apparatus of FIG. 4 is readily apparent. The difference resides primarily in the fact that the stamping 7" has a relatively thick side wall the thickness of which approximates that of the bottom of the shaped product, the product also including a central reverse extruded upwardly extending portion 28.

Although the invention is described and illustrated with reference to a plurality of embodiments thereof, it is to be expressly understood that it is in no way limited to such preferred embodiments but is capable of numerous modifications within the scope of the appended claims.

We claim:

1. In a method for the plastic forming of materials between the dies of a die assembly which has a place for the outflow of the product and which is compressed by the application of a pulsating compressive force applied to the material by a pulsating ram, said die assembly comprising a female die in which the worked material is disposed at the start of its deformation, and a composite male die which enters the female die along its longitudinal axis and compressively engages the material to be formed, the male die being made up of plurality of sections, each section being capable of axial movement in the female die independently of the movement of the other section, a first section of the male die being located nearest to the place of the outflow of the product, the improvement wherein the first section of the male die is rigidly connected to a reciprocating power driven plunger which positively drives the first section against the worked material, and the other sections of the male die are yieldably elastically thrust against the worked material so that during the periods of thrusting against the material in the die assembly by the ram the first section of the male die effects plastic forming of the material in the female die, thus shaping a portion of the product, the other sections of the male die at that time being motionless with respect to the material so that they are additionally elastically stressed, and in the periods wherein the ram reduces its thrust against the material in the die assembly the other sections of the male effect nonsimultaneously plastic forming of the material under the action of the additional stress to which they are elastically subjected in succession beginning with the section located nearest to the first section of the male die and finishing with the section of the male die which is most distant from the first section of the male die.

2. In an apparatus for the plastic forming of materials between dies of a die assembly which has a place for the outflow of the product and which is compressed by the application of a pulsating compressing force applied to the material by a pulsating ram, said die assembly comprising a female die in which the worked material is disposed at the start of deformation, and a composite male die which enters the female die along its longitudinal axis and compressively engages the materials to be formed, the male die being made up of a plurality of sections, each section being capable of axial movement in the female die independently of the movement of the other sections, a first section of the male die being located nearest to the place of the outflow of the product, the improvement which comprises a reciprocating power driven plunger, means rigidly connecting the first section of the male die to the driven plunger, means yieldably elastically thrusting the other sections of the male die against the worked material so that during the period of thrusting against the material in the die assembly by the ram the first section of the male die effects plastic forming of the material in the female die, thus shaping a portion of the product, means which at that time holds the other sections of the male die motionless with respect to the material so that they are being additionally elastically stressed, and means in the periods wherein the ram reduces its thrust against the material in the die assembly for non-simultaneously moving the other sections of the male die against the material in the female die thereby to form the material under the action of the additional stress to which such sections of the male die are elastically subjected in succession beginning with with a section located nearest to the first section of the male and finishing with the last section of the male die which is most distant from the first section of the male.

3. An apparatus for the plastic forming of materials, comprising a fixed housing body, a female die for containing the material to be worked, such material being in contact on one of its sides with a ram which enters one of the ends of the female die and on the other of its ends with a male die which is builtup of several elements arranged movably one with respect to the other, said elements of the male die being in contact at one of their ends with the to-be-worked material, such elements being in contact at the other of their ends with respectively intermediate elements, one of the intermediate elements being supported on a disc which is rigidly attached to one side of the housing body, while the remaining intermediate elements are supported on respective cylindrical supports which pass movably through holes in the disc and are in contact with respective concentric supporting elements telescopically disposed one within the other, the outermost element being arranged movably and with a seal in a hole in the housing body, said hole being provided with a cover which hermetically covers the hole in the housing body, the space between the cover and the supporting elements being filled with a liquid and being connected via a conduit system including a pressure reducer to a reservoir containing an elastic fluid medium, said conduit system further including a check valve, and measuring instruments and devices for limiting the pressure of the elastic fluid medium in the reservoir.

4. An apparatus according to claim 3, wherein the elastic fluid medium in the reservoir is pressurized to a predetermined preliminary pressure, and its type and volume are chosen so that at pressures higher than the predetermined preliminary pressure the elastic medium has a desired degree of compressibility.

5. An apparatus according to claim 3 for forming material by direct extrusion, wherein the intermediate elements and the supporting elements are concentrically inserted sleeves, and the radially innermost one of the intermediate sleeves is supported on the disc.

6. An apparatus according to claim 3 for forming material by direct extrusion, wherein the disc has a central through-hole with a diameter slightly greater than the diameter of the product, while the central supporting sleeve has two steps and is positioned with its smaller step movable in and sealed to the central through-hole of the cover.

7. An apparatus according to claim 3 for forming material by backflow extrusion and stamping, wherein the radially innermost intermediate element for backflow extrusion and the element for stamping, as well as the remaining supporting elements for backflow extrusion and the supporting elements for stamping are made up as concentric sleeves inserted one inside the other.

8. An apparatus according to claim 7 for forming material by backflow extrusion, wherein the intermediate sleeve which is supported by the disc is the radially outermost of the intermediate sleeves.

9. An apparatus according to claim 7 for forming material by stamping, wherein the elements which are in contact with to-be-worked material have a contact surface corresponding to the configuration of the material to be formed, while the intermediate element which is supported on the disc corresponds in shape to the element which finally shapes the product.

* * * * *